April 28, 1942.  H. STARGARDT  2,281,120
FLOOR CONVEYER FOR TRUCKS
Filed July 29, 1940  2 Sheets-Sheet 1
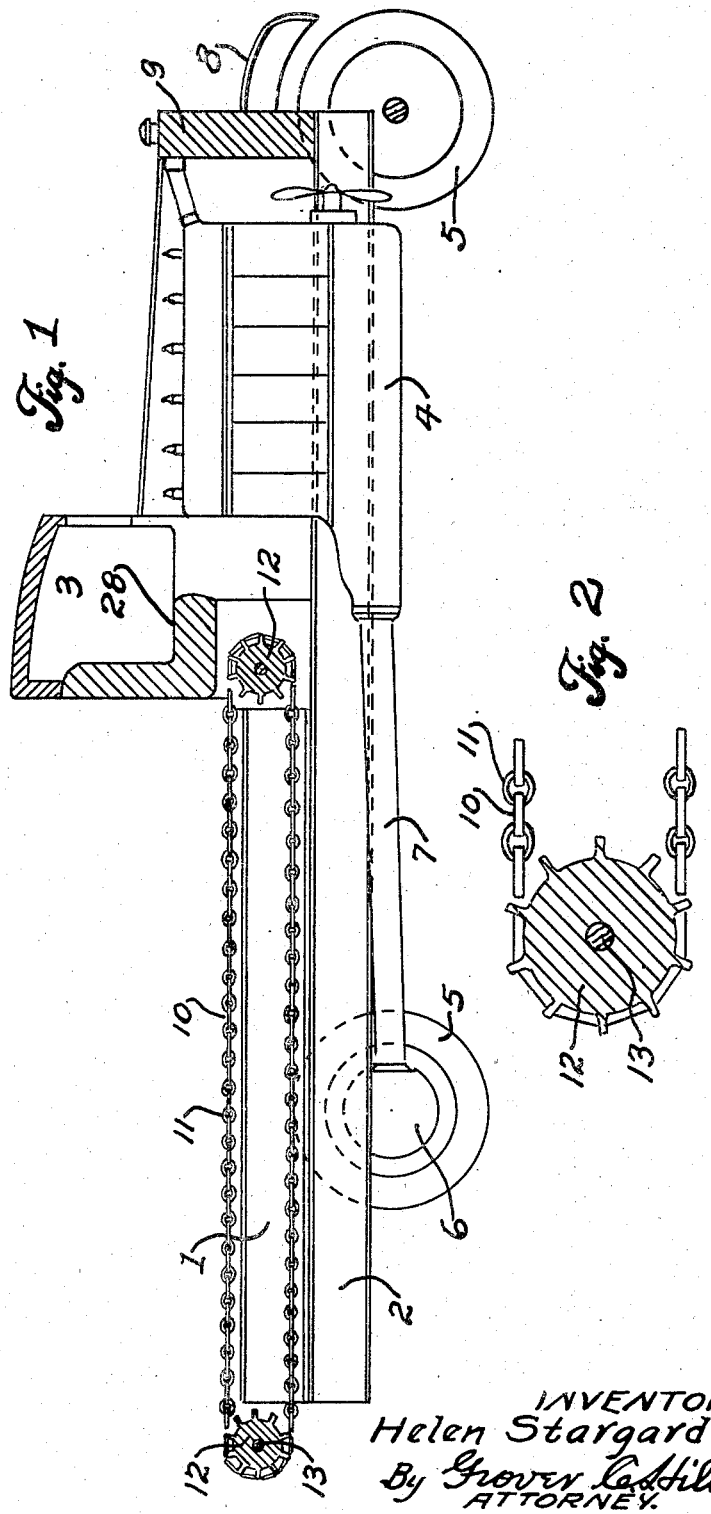
INVENTOR:
Helen Stargardt.
By Grover Cathill,
ATTORNEY.

April 28, 1942.　　　H. STARGARDT　　　2,281,120
FLOOR CONVEYER FOR TRUCKS
Filed July 29, 1940　　　2 Sheets-Sheet 2
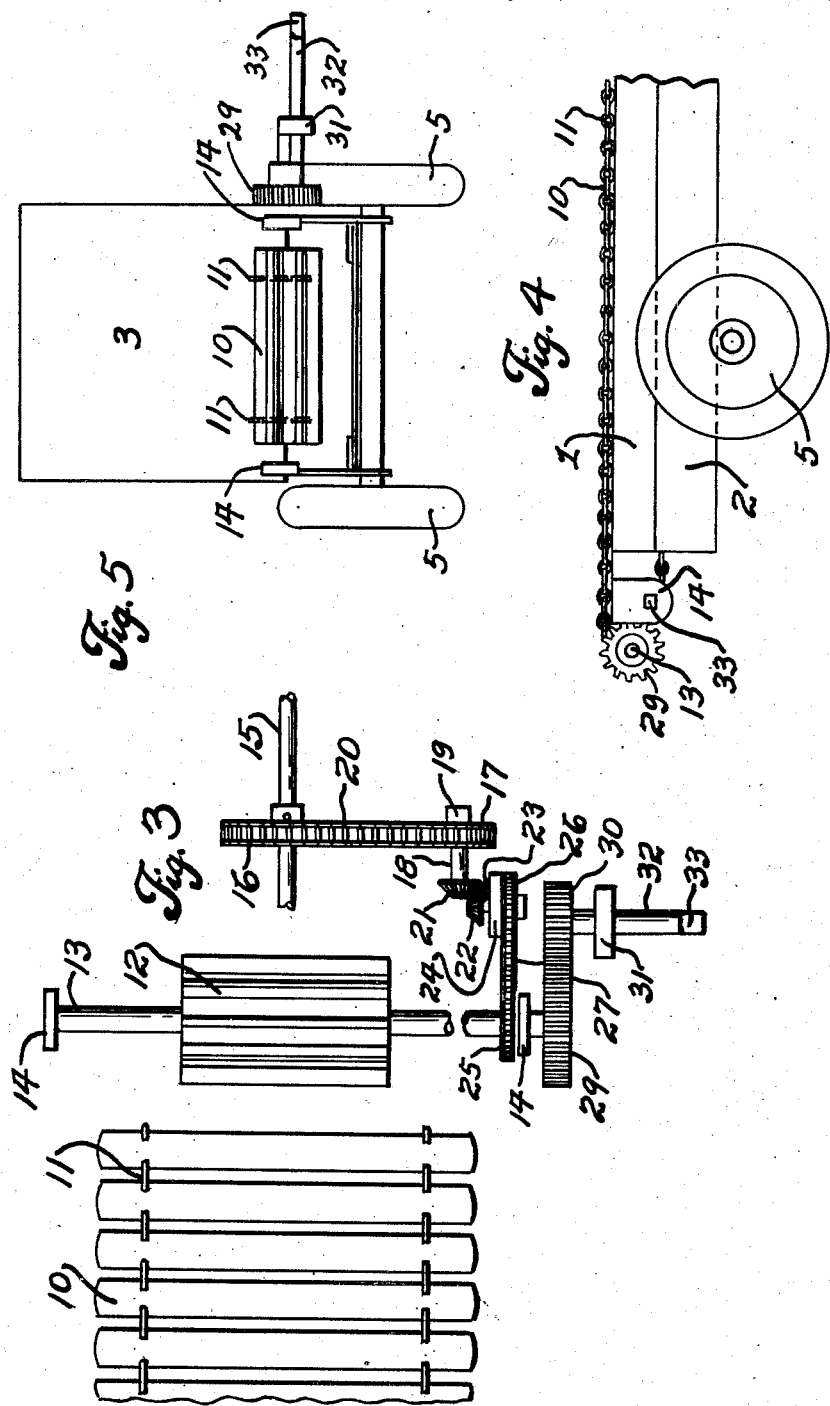
INVENTOR:
Helen Stargardt.
By Grover C. Hill,
ATTORNEY.

Patented Apr. 28, 1942

2,281,120

UNITED STATES PATENT OFFICE 2,281,120

FLOOR CONVEYER FOR TRUCKS

Helen Stargardt, Detroit, Mich.

Application July 29, 1940, Serial No. 348,218

1 Claim. (Cl. 214—83)

The present invention relates to improvements in trucks and has for its object the provision of a floor constructed in the form of a conveyer belt and which may be operated by the truck motor or may be manually operated.

The object of the invention is to save hand lifting of lumber and heavy articles in loading and unloading the truck.

Another advantage of the invention is that by removing the body of the truck it may be readily applied to any kind of truck with minimum expense.

With the foregoing in mind, it will become readily apparent that the invention possesses further advantages, all of which will be clearly revealed during the course of the following detailed description, illustrated throughout the accompanying drawings, and more fully pointed out in the appended claim.

With reference to the drawings:

Figure 1 is a longitudinal section of the complete invention through the center thereof and showing the same normally installed upon a truck.

Figure 2 is an enlarged view of one of the sprocket drums, also showing a portion of the conveyer belt.

Figure 3 is an enlarged plan view of the mechanism employed for actuating the floor conveyer by the truck motor, and also manually operated means therefor.

Figure 4 is a partial side elevation of the invention.

Figure 5 is a rear elevation of the complete invention.

The invention consists of longitudinally extending frame 1 which is secured to chassis frame 2, and referring to Figure 1 the truck cab is shown at 3, motor 4, wheels 5, differential 6, propeller shaft housing 7 and fender 8, also radiator 9 where indicated.

The floor of the truck consists of an endless belt having spaced apart slats 10 which are flexibly connected together by links 11, said belt is adapted to engage specially designed sprocket drums 12, said drums are mounted upon transverse shafts 13 respectively, said shafts are also journaled within bearings 14 where shown.

Referring to Figure 3 it is seen that the floor conveyer may be operated by motor 4 in the following manner:

The crankshaft of motor 4 is shown at 15 and has sprocket wheel 16 keyed thereto as shown, an additional sprocket wheel 17 is provided and is mounted upon shaft 18 with bearing 19 therefor, also chain 20 connecting sprocket wheels 16 and 17. Bevel gear 21 is secured to shaft 18 and meshes with bevel gear 22 upon shaft 23, also manually operated clutch 24 being provided where located.

Additional sprocket wheels 25 and 26 are provided and are connected by chain 27. Sprocket wheel 25 is keyed to shaft 13.

Clutch 24 is operated from the driver's seat 28, but this control is not indicated in the drawings.

The floor conveyer is operated manually as follows:

Still referring to Figure 3, gear 29 being keyed to shaft 13 within the rear of the apparatus, gear 30 is provided and meshes with gear 29, bearing 31 being for shaft 32 upon which gear 30 is connected. Shaft 32 has square end 33 thereon for the application of a crank (not shown).

By manually operating shaft 32 the floor conveyer may be actuated as slow as desired, thus facilitating loading and unloading of the truck.

Again referring to Figure 3, shaft 13 is broken for the reason that the power control of shaft 13 is at the front of the apparatus nearest motor 4, while the manually operating means of shaft 13 is at the rear of the apparatus.

The use of this invention will save much time in loading and unloading the truck, it also relieves the operator of the burden and hazard of much hand lifting, requiring a less number of persons for this work, hence the advantage of the invention from a safe and economical viewpoint.

In conclusion, let it be understood that the complete disclosure herewith is merely illustrative of the general principle of the invention sought to be protected by Letters Patent, and any contemplated changes made therein that would fall directly within the scope of the claim.

Having thus fully described my invention, what I claim as new is:

In a floor conveyer for trucks, a frame, a drive shaft, a driven shaft, said shafts being located at opposite ends of the frame, drums carried by said shafts and turning with the shafts, said drums being of appreciably less length than the shafts carrying the same and formed with longitudinally extending radial ribs spaced from each other circumferentially of the drum, and an endless carrier extending longitudinally in the frame and having upper and lower flights and portions trained about the drums, said carrier consisting of transversely extending slats having end portions projecting from the ends of the drums, and rings engaged through side edge portions of the slats outwardly of the ends of the drums and connecting the slats in spaced relation to each other, the slats being of a width adapting them to fit between the ribs of the drums with the slats resting against the drums and the ribs passing through the spaces between the slats and engaging the side edges of the slats.

HELEN STARGARDT.